United States Patent
Pan et al.

(10) Patent No.: US 10,419,951 B2
(45) Date of Patent: Sep. 17, 2019

(54) METHOD AND DEVICE FOR SETTING AN ISOLATION BANDWIDTH OF A COMBINER

(71) Applicant: CHINA UNITED NETWORK COMMUNICATIONS GROUP COMPANY LIMITED, Beijing (CN)

(72) Inventors: Guixin Pan, Beijing (CN); Xiaoming Huang, Beijing (CN); Wei Li, Beijing (CN); Biao He, Beijing (CN); Jun Yan, Beijing (CN); Junbin Mo, Beijing (CN); Huiming Ge, Beijing (CN); Yuchen Shi, Beijing (CN); Jianquan Wang, Beijing (CN); Qingyu Cai, Beijing (CN)

(73) Assignee: CHINA UNITED NETWORK COMMUNICATIONS GROUP COMPANY LIMITED, Beijing (CN)

( * ) Notice: Subject to any disclaimer, the term of this patent is extended or adjusted under 35 U.S.C. 154(b) by 65 days.

(21) Appl. No.: 15/683,072

(22) Filed: Aug. 22, 2017

(65) Prior Publication Data

US 2017/0353875 A1 Dec. 7, 2017

Related U.S. Application Data

(63) Continuation of application No. PCT/CN2016/081356, filed on May 7, 2016.

(30) Foreign Application Priority Data

May 7, 2015 (CN) .......................... 2015 1 0229717
May 7, 2015 (CN) .......................... 2015 1 0229790

(51) Int. Cl.
*H04W 24/02* (2009.01)
*H01P 1/213* (2006.01)
(Continued)

(52) U.S. Cl.
CPC .............. *H04W 24/02* (2013.01); *H01P 1/213* (2013.01); *H04B 1/00* (2013.01); *H04B 1/10* (2013.01); *H04W 24/08* (2013.01)

(58) Field of Classification Search
CPC . H01P 1/213; H04B 1/00; H04B 1/10; H04W 24/02; H04W 24/08
See application file for complete search history.

(56) References Cited

U.S. PATENT DOCUMENTS 6,785,741 B1 * 8/2004 Mandalia ............ H04M 3/5191
379/70
2010/0002755 A1 * 1/2010 Heidari .................. H04B 3/542
375/222

(Continued)

FOREIGN PATENT DOCUMENTS

CN 101998704 A 3/2011
CN 104300193 A 1/2015

(Continued)

OTHER PUBLICATIONS

Jun. 28, 2016 Written Opinion issued in International Patent Application No. PCT/CN2016/081356.

(Continued)

*Primary Examiner* — Benjamin H Elliott, IV
(74) *Attorney, Agent, or Firm* — Oliff PLC

(57) ABSTRACT

A method for combining with a minimum isolation bandwidth includes: determining an insertion loss and an isolation between ports of a combiner; calculating a total isolation bandwidth of an isolation band in the combiner according to the insertion loss and the isolation between ports; determining guard bandwidths adjacent to the isolation band in combined systems, the combined systems being at least two communication systems combined by the combiner; and, calculating an actual isolation bandwidth of the (Continued)

combiner according to the guard bandwidths of the combined systems and the total isolation bandwidth.

20 Claims, 5 Drawing Sheets

(51) Int. Cl.
*H04W 24/08* (2009.01)
*H04B 1/00* (2006.01)
*H04B 1/10* (2006.01)

(56) References Cited

U.S. PATENT DOCUMENTS

| | | | | |
|---|---|---|---|---|
| 2010/0014603 A1* | 1/2010 | Palanki | ............ | H04L 5/023 375/260 |
| 2010/0127799 A1* | 5/2010 | Bauer | ............ | H03H 9/0542 333/195 |
| 2012/0200464 A1* | 8/2012 | Nielsen | ............ | H01Q 1/243 343/702 |
| 2012/0250591 A1* | 10/2012 | Diao | ............ | H04L 5/001 370/280 |
| 2013/0094409 A1* | 4/2013 | Li | ............ | H04W 72/044 370/280 |
| 2016/0012849 A1* | 1/2016 | Feldman | ............ | G06F 3/0608 360/48 |
| 2017/0019146 A1* | 1/2017 | Jin | ............ | H04B 1/0475 |
| 2017/0077985 A1* | 3/2017 | Li | ............ | H04L 1/00 |
| 2017/0353875 A1* | 12/2017 | Pan | ............ | H01P 1/213 |

FOREIGN PATENT DOCUMENTS

| | | |
|---|---|---|
| CN | 104901752 A | 9/2015 |
| CN | 104968010 A | 10/2015 |
| WO | 2009/079701 A1 | 7/2009 |

OTHER PUBLICATIONS

Jun. 28, 2016 Search Report issued in International Patent Application No. PCT/CN2016/081356.

Pan, Ning et al. "Design of Dual-Frequency Coaxial Cavity Combiner Based on Common Cavity". Electronic Coomponents and Materials, vol. 33 No. 9, pp. 75-77 (2014).

Zhang, Yan, "Magic Radio, Magic of Refarming", ZTE Communications, No. 6, (2014).

\* cited by examiner

METHOD AND DEVICE FOR SETTING AN ISOLATION BANDWIDTH OF A COMBINER

CROSS-REFERENCE TO RELATED APPLICATION

This application is a Bypass Continuation Application of PCT/CN2016/081356 filed May 7, 2016, which claims priorities to Chinese Patent Application No. 201510229717.8 filed to the Chinese Patent Office on May 7, 2015, entitled "METHOD AND DEVICE FOR CALCULATING ISOLATION BANDWIDTH OF COMBINER", and Chinese Patent Application No. 201510229790.5 filed to the Chinese Patent Office on May 7, 2015, entitled "METHOD AND DEVICE FOR CALCULATING INSERTION LOSS OF COMBINER", the entirety of each is incorporated hereby by reference.

TECHNICAL FIELD

The present disclosure relates to the technical field of communications, and in particular to a method and device for combining with a minimum isolation bandwidth.

BACKGROUND

As one key device for sharing multi-network in an indoor distribution system, a combiner mainly functions to combine signals from a plurality of communication systems into a single indoor distribution system. In the combiner, a fixed radio frequency channel is formed by two or more bidirectional filters, for allowing only frequency signals within passbands to pass through and blocking the passing of other frequency signals. Inevitably, there is certain loss in passband regions of the filters, and particularly larger loss at the edges of the passbands. The insertion loss of the combiner will influence the efficiency of the communication systems. Moreover, to ensure the normal operation of the mobile communication systems if they are co-sited, the isolation between ports of the combiner in the indoor distribution system needs to meet the requirements of related protocols. Therefore, the insertion loss and the isolation between ports of the combiner are important indicators of the performance of the combiner.

SUMMARY

In a first aspect, an embodiment of the present disclosure provides a method for combining with a minimum isolation bandwidth. The method includes: determining an insertion loss and an isolation between ports of a combiner; calculating a total isolation bandwidth of the combiner according to the insertion loss and the isolation between ports; determining guard bandwidths of combined systems; and calculating an actual isolation bandwidth of the combiner according to the guard bandwidths of the combined systems and the total isolation bandwidth.

In a second aspect, an embodiment of the present disclosure provides a device for combining with a minimum isolation bandwidth. The device may comprise a memory and one or more processors. The memory is configured to store programs. The one or more processors are configured to read programs in the memory and perform the following operations: determining an insertion loss and an isolation between ports of a combiner; calculating a total isolation bandwidth of the combiner according to the insertion loss and the isolation between ports; determining guard bandwidths of combined systems; and calculating an actual isolation bandwidth of the combiner according to the guard bandwidths of the combined systems and the total isolation bandwidth.

BRIEF DESCRIPTION OF THE DRAWINGS

To describe the technical solutions in embodiments of the present disclosure more clearly, the accompanying drawings to be used in the description of the embodiments or the prior art will be briefly described below. Obviously, the accompanying drawings to be described hereinafter are merely some of the embodiments of the present disclosure, and a person of ordinary skill in the art can obtain other drawings according to these drawings without paying any creative effort.

DETAILED DESCRIPTION

The technical solutions in the embodiments of the present disclosure will be clearly and completely described below with reference to the accompanying drawings in the embodiments of the present disclosure. Obviously, the embodiments described herein are merely a part but not all of the embodiments of the present disclosure. All other embodiments obtained based on the embodiments in the present disclosure by a person of ordinary skill in the art without paying any creative effort shall fall into the protection scope of the present disclosure.

In order to make the insertion loss and the isolation between ports of the combiner meet the requirements, a certain isolation bandwidth is required between passbands of the combined communication systems. The size of the isolation bandwidth is calculated by simulation software according to the values of the insertion loss and the isolation between ports. By taking two communication systems with adjacent passbands as example, an isolation bandwidth of at least 5 MHz is generally reserved during the combination of the two communication systems by the combiner.

With the development of the mobile communication, the frequency resources become more and more scarce, and there are more and more adjacent frequencies in the communication systems. Moreover, in the prior art, when two adjacent communication systems are combined, in order to ensure that the insertion loss and the isolation between ports of the combiner accord with the requirements, generally, the isolation bandwidth between the combined systems at least occupies 5 MHz frequency resources. As a result, such wide isolation bandwidth will cause great waste of resources of the communication systems.

To make the advantages of the technical solutions of the present disclosure clearer, the present disclosure will be described below in detail with reference to the accompanying drawings and embodiments.

Figure 1:
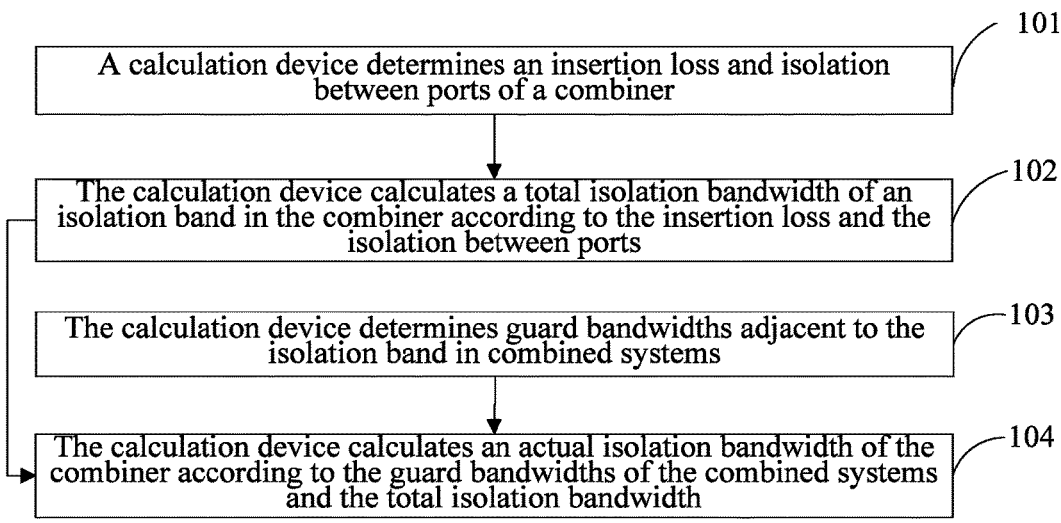
FIG. 1 is a flowchart of a method according to an embodiment of the present disclosure.

An embodiment of the present disclosure provides a method for combining with a minimum isolation bandwidth, which is applicable to a calculation device. The calculation device is a device or apparatus with a function of implementing the method according to this embodiment of the present disclosure. The device or apparatus is allowed to have the function of implementing the method according to this embodiment of the present disclosure by installing related software or hardware in the device or apparatus. As shown in FIG. 1, the method includes the following steps.

101: The calculation device determines an insertion loss and isolation between ports of a combiner.

102: The calculation device calculates a total isolation bandwidth of an isolation band in the combiner according to the insertion loss and the isolation between ports.

Wherein, calculating, by the calculation device, the total isolation bandwidth of the combiner according to the insertion loss and the isolation between ports may be realized by a method for simulating and calculating the isolation bandwidth according to requirements of the insertion loss and the isolation between ports. Since various companies have independently developed or purchased simulation software, no limitation is given to the simulation method herein.

103: The calculation device determines guard bandwidths adjacent to the isolation band in combined systems.

Wherein, the combined systems are at least two communication systems combined by the combiner, and frequency bands of the combined systems include operating bands and guard bands. The calculation device may determine guard bandwidths of the combined systems according to the configuration information of the combined systems.

104: The calculation device calculates an actual isolation bandwidth of the combiner according to the guard bandwidths and the total isolation bandwidth.

In this embodiment of the present disclosure, a computer may calculate an actual isolation bandwidth of the combiner according to the following formula: the total isolation bandwidth=the guard bandwidths adjacent to the isolation band in the combined systems+the actual isolation bandwidth.

It is to be noted that, in this embodiment of the present disclosure, the guard bandwidths in the combined systems are used as a part of the total isolation bandwidth of the combiner. Therefore, the operating bandwidth of each combined system to be occupied by the isolation bandwidth is reduced, and the waste of frequency resources is avoided particularly during the combination of adjacent-channel combined systems. Meanwhile, for 4G (4th Generation) wideband communication systems for realizing high-speed data communication by using wide bandwidths, the method in this embodiment of the present disclosure may reduce the influence of the isolation band on the high-speed data transmission.

It is to be noted that, this embodiment of the present disclosure may be applicable to various scenarios, for example, adjacent-channel combination of an LTE (Long Term Evolution) FDD (Frequency Division Duplexing) system and an LTE TDD (Time Division Duplexing) system, adjacent-channel combination of an LTE TDD system and another LTE TDD system, and combination of equiband adjacent-channel systems such as an LTE FDD system and another LTE FDD system.

In the embodiment of the present disclosure, first, an insertion loss of a combiner and an isolation between ports of the combiner are determined, and a total isolation bandwidth of the combiner is calculated according to the insertion loss and the isolation between ports. In turn, guard bandwidths of combined systems are determined, and an actual isolation bandwidth of the combiner is calculated according to the guard bandwidths of the combined systems and the total isolation bandwidth. Thus, the calculation device may use the guard bandwidths in the combined systems as a part of the total isolation bandwidth required during the combination by the combiner, so that the frequency band isolation between the combined systems is reduced, and the bandwidth of each combined system to be occupied by the isolation bandwidth is reduced. Accordingly, the bandwidth for transmission in each system is increased relatively, the waste of frequency resources is avoided, and the utilization of frequency resources is increased.

Figure 2:
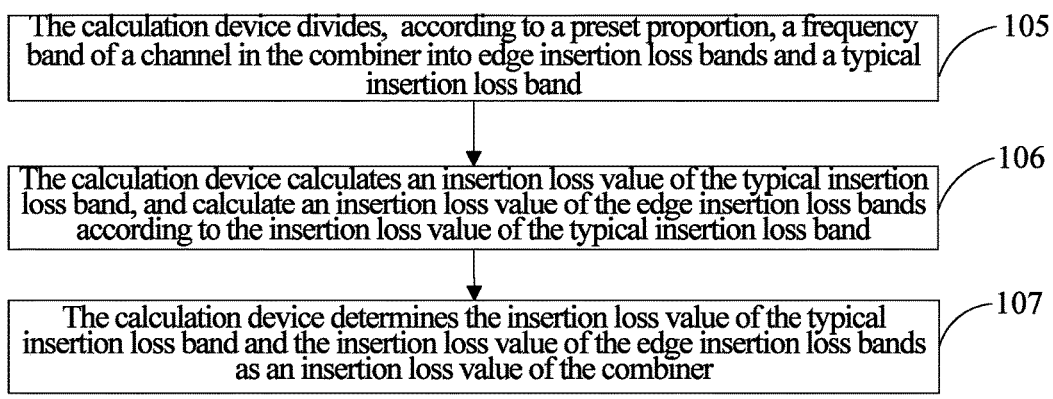
FIG. 2 is a flowchart of a method according to an implementation of the embodiment of the present disclosure.

In an implementation of this embodiment of the present disclosure, a method for calculating, by the calculation device, the insertion loss of the combiner in the step 101 may specifically include steps 105, 106 and 107, as shown in FIG. 2.

105: The calculation device divides, according to a preset proportion, a frequency band of each channel in the combiner into edge insertion loss bands and a typical insertion loss band.

Wherein, the typical insertion loss band is a frequency band with a performance reaching a preset standard in the combined system. The edge insertion loss bands are frequency bands with a performance not reaching the preset standard in the combined system. Combined systems are communication systems combined by the combiner. Combined channels are in one-to-one correspondence to the combined systems. The combiner at least includes two combined systems.

106: The calculation device calculates an insertion loss value of the typical insertion loss band, and calculates an insertion loss value of the edge insertion loss bands according to the insertion loss value of the typical insertion loss band.

107: The calculation device determines the insertion loss value of the typical insertion loss band and the insertion loss value of the edge insertion loss bands as an insertion loss value of the combiner.

In this embodiment of the present disclosure, the edge insertion loss bands may include a left edge insertion loss band and a right edge insertion loss band. The left edge insertion loss band and the right edge insertion loss band are located at two ends of the typical insertion loss band, respectively. Therefore, the insertion loss value of the edge insertion loss bands includes an insertion loss value of the left edge insertion band and an insertion loss value of the right edge insertion band. The combined systems of the combiner are adjacent-channel combined systems.

In the implementation of this embodiment of the present disclosure, first, a frequency band for transmitting signals in a combined channel is divided into edge insertion loss bands and a typical insertion loss band according to a preset proportion, wherein the typical insertion loss band is frequency band with a performance reaching a preset standard in a combined system, and the edge insertion loss bands are frequency bands with a performance not reaching the preset standard in the combined system, i.e., frequency bands which may be used for transmitting data but have a certain influence on the system performance. In turn, an insertion loss value of the typical insertion loss band and an insertion loss value of the edge insertion loss bands are calculated, respectively. Finally, an insertion loss value of the combiner is determined according to the insertion loss value of the typical insertion loss band and the insertion loss value of the edge insertion loss bands. Thus, when determining the insertion loss of each channel in the combiner, the insertion losses of the edge insertion loss bands and the insertion loss of the typical insertion loss band are calculated respectively, so that the overall performance loss of the combined system caused by the calculated insertion loss may be within a tolerable range. Meanwhile, the edge insertion loss value of the corresponding combined channel is far greater than the insertion loss value obtained in the prior art. Therefore, given the same isolation of the combiner, the method of the present disclosure will decrease the isolation bandwidth of the combiner, and thus reduce the frequency resources occupied by the isolation bandwidth and the waste of the frequency resources.

Figure 3:
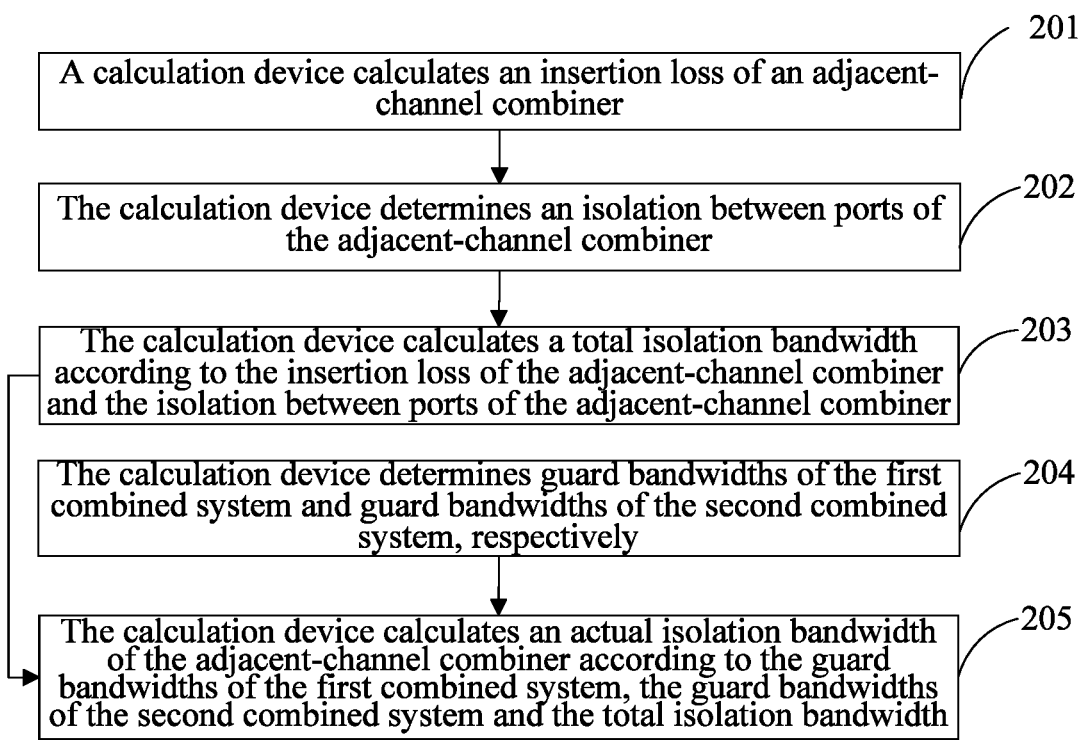
FIG. 3 is a flowchart of a method according to another embodiment of the present disclosure.

Another embodiment of the present disclosure provides a method for combining with a minimum isolation bandwidth, which is applicable to a calculation device, for example, a computer. The combiner is, for example, an adjacent-channel combiner, and systems to be combined are a first combined system and a second combined system. As shown in FIG. 3, the method includes the following steps.

201: The calculation device determines an insertion loss of the adjacent-channel combiner.

Wherein, in this embodiment of the present disclosure, the combiner combines two combined systems, and a channel corresponding to each combined system has a corresponding insertion loss value.

It is to be noted that, no limitation is given to the method for determining the insertion loss herein. It is possible to determine the insertion loss by: first, determining, according to an estimation of an uplink sensitivity of the combined system, an uplink insertion loss corresponding to a permissible desensitization value of the uplink sensitivity; then, determining, according to an estimation of a downlink power link of the combined system, a downlink insertion loss corresponding to a permissible attenuation value of the downlink power link; and, determining a minimum value of the uplink insertion loss and the downlink insertion loss as an insertion loss of a corresponding channel of the combined system. The uplink insertion loss and the downlink insertion loss may be directly acquired from a builder of the combined system (for example, an operator of the combined system). For example, if the operator determines that the uplink insertion loss corresponding to the permissible uplink desensitization value of the first combined system is 0.8 dB and the downlink insertion loss corresponding to the permissible attenuation value of the downlink power link of the first combined system is 1 dB, the permissible insertion loss of the first combined channel corresponding to the first combined system of the combiner is determined as 0.8 dB.

Figure 4:
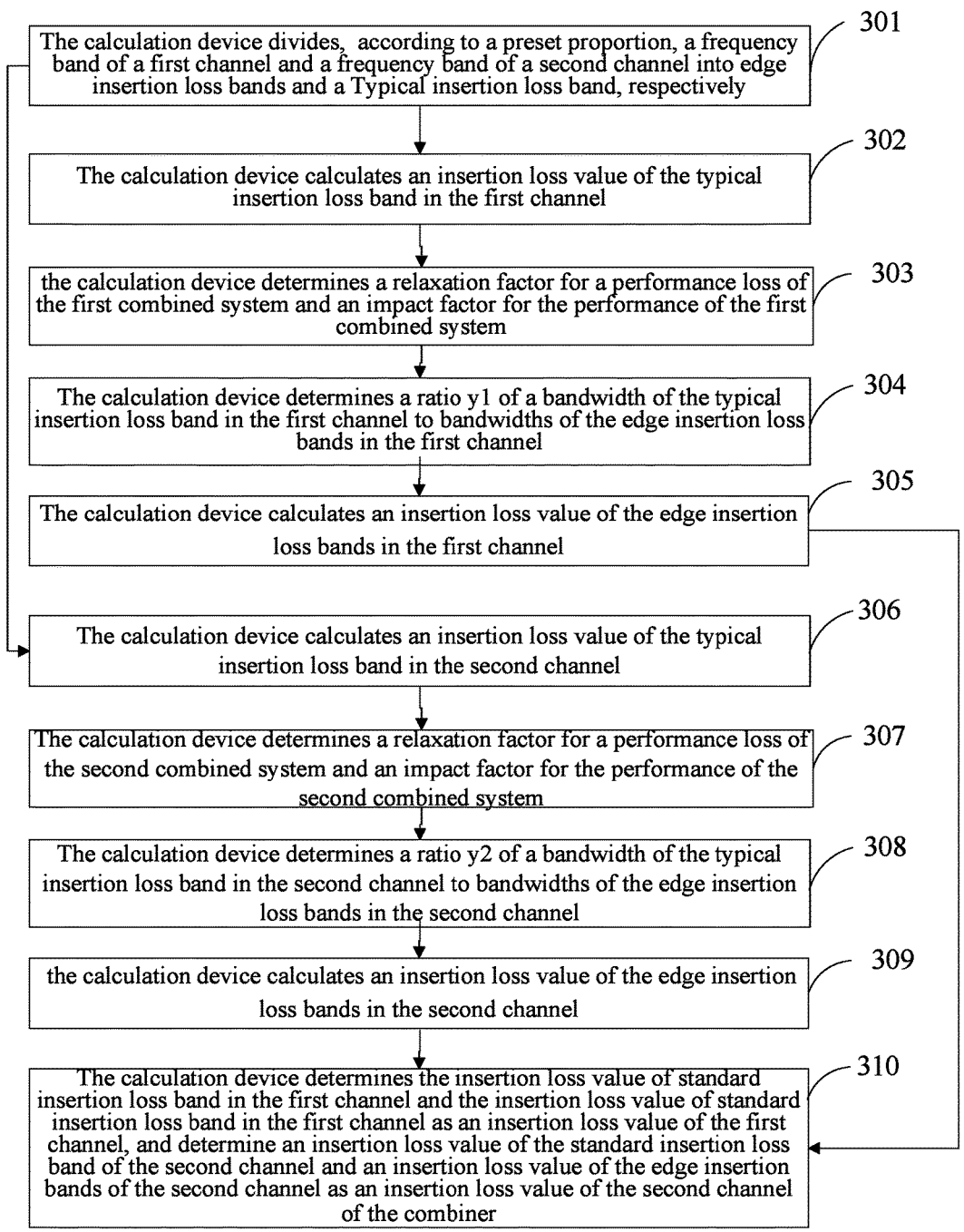
FIG. 4 is a flowchart of a method according to an implementation of the another embodiment of the present disclosure.

An implementation of this embodiment of the present disclosure provides a method for calculating, by the calculation device, the insertion loss of the adjacent-channel combiner, as shown in FIG. 4. The first combined system of the combiner corresponds to a first channel of the combiner, and the second combined system corresponds to a second channel of the combiner. The method includes the following steps.

301: The calculation device divides, according to preset proportions, frequency band of the first channel and frequency band of the second channel into edge insertion loss bands and a typical insertion loss band, respectively.

Wherein, the preset proportions may be set according to specific conditions of the systems. The typical insertion loss band is a frequency band with a performance reaching a preset standard in the combined system. The edge insertion loss bands are frequency bands with a performance not reaching the preset standard in the combined system.

It is to be noted that, the edge insertion loss bands may include a left edge insertion loss band and a right edge insertion loss band. The left edge insertion loss band and the right edge insertion loss band are located at two ends of the typical insertion loss band, respectively. When the edge insertion loss bands include the left edge insertion loss band and the right edge insertion loss band, the preset proportion may directly give a proportion of the left edge insertion loss band, a proportion of the typical insertion loss band, and a proportion of the right edge insertion loss band.

302: The calculation device calculates an insertion loss value of the typical insertion loss band in the first channel.

Calculating the insertion loss value of the typical insertion loss band may be realized by a method for calculating the insertion loss in the prior art. For example, the insertion loss value of the typical insertion loss band in the first channel may be calculated by: first, determining, according to an estimation of an uplink sensitivity of the first combined system, an insertion loss value corresponding to a permissible desensitization value of the uplink sensitivity; then, determining, according to an link budget of a downlink power link of the first system, an insertion loss value corresponding to a permissible attenuation value of the downlink power link; and, determining a minimum value of the both as an insertion loss of the corresponding channel of the combined system.

It is to be noted that, in this embodiment of the present disclosure, before the step 301, the calculation device may calculate an overall insertion loss value of the first channel by the method described above, and then directly use the overall insertion loss vale as the insertion loss value of the typical insertion loss band in the first channel in this step.

303: The calculation device determines a relaxation factor for a performance loss of the first combined system and an impact factor for the performance of the first combined system.

Wherein, the relaxation factor for the performance loss of the first combined system may be obtained from the system builder, and the impact factor for the performance of the first combined system may be obtained from the provider of the combined system apparatus. As for the requirements for the insertion loss of the combiner in the prior art, when the combiner in the LTE system performs non-isolation bandwidth adjacent-channel combination, the insertion loss of the combiner may be relaxed additionally. The relaxation factor is a proportion which may be further relaxed additionally in this embodiment of the present disclosure with regard to the requirements for the insertion loss in the prior art, when the combiner performs non-isolation bandwidth adjacent-channel combination. In the LTE system, since methods such as self-adaptive scheduling are adopted, the impact of the insertion loss on the performance loss of the combined systems may be reduced properly, and the impact factor is a proportion in which the performance loss of the first combined system is impacted by the insertion loss of the combiner.

304: The calculation device determines a ratio y1 of the bandwidth of the typical insertion loss band in the first channel to the bandwidths of the edge insertion loss bands in the first channel.

For example, when dividing the first channel in the step 301, if the preset proportion of the edge insertion loss bands to the typical insertion loss band is 1:9, that is, if the ratio of the bandwidths of the edge insertion loss bands to the bandwidth of the typical insertion loss band is 1:9, y1 is 9.

305: The calculation device calculates an insertion loss value of the edge insertion loss bands in the first channel.

Wherein, the way of calculating, by the calculation device, the insertion loss value of the edge insertion loss bands of the first channel may be as follows: calculating the insertion loss value of the edge insertion loss bands according to the following formula: the insertion loss value of the typical insertion loss band×the relaxation factor×y1=the impact factor×the insertion loss value of the edge insertion loss bands.

It is to be noted that, when the edge insertion loss bands include a left edge insertion loss band and a right edge insertion loss band, the calculation device needs to calculate an insertion loss value of the left edge insertion loss band and an insertion loss value of the right edge insertion loss band. The method for calculating, by the calculation device, the insertion loss value of the left edge insertion loss band and the insertion loss value of the right edge insertion loss band of the first channel may be as follows. First, an insertion loss weight x1 that the insertion loss value of the left edge insertion band accounts for the insertion loss value of the edge insertion loss bands is determined, and an insertion loss weight x2 that the insertion loss value of the right edge insertion band accounts for the insertion loss value of the edge insertion loss bands is determined. In turn, the insertion loss value of the left edge insertion loss band is determined according to the following formula: the insertion loss value of the typical insertion loss band×the relaxation factor×y1=(x1/(x1+x2))×the impact factor×the insertion loss value of the left edge insertion loss band, and the insertion loss value of the right edge insertion loss band is determined according to the following formula: the insertion loss value of the typical insertion loss band×the relaxation factor×y1=(x2/(x1+x2))×the impact factor×the insertion loss value of the right edge insertion loss band. The method for determining, by the calculation device, the insertion loss weight x1 that the insertion loss value of the left edge insertion band accounts for the insertion loss value of the edge insertion loss bands may be as follows: determining the insertion loss weight x1 according to the weight that the bandwidth of the left edge insertion loss band account for the total bandwidth of the first channel.

For example, when dividing the first channel in the step 301, if the preset proportion of the edge insertion loss bands and the typical insertion loss band is 1:8:1, that is, if the ratio of the bandwidth of the left edge insertion loss band to the bandwidth of the typical insertion loss band to the bandwidth of the right edge insertion loss band is 1:8:1, the weight that the bandwidth of the left edge insertion loss band account for the total bandwidth of the first channel is 10%. Hence, the insertion loss weight x1 that the insertion loss value of the left edge insertion band accounts for the insertion loss value of the first channel is determined as 10%. In a similar way, the weight of the right edge insertion loss band may be calculated. The remaining is the weight of the typical insertion loss band.

306: The calculation device calculates an insertion loss value of typical insertion loss band in a second channel.

307: The calculation device determines a relaxation factor for a performance loss of the second combined system and an impact factor for the performance of the second combined system.

308: The calculation device determines a ratio y2 of the bandwidth of the typical insertion loss band in the second channel to the bandwidths of the edge insertion loss bands in the second channel.

309: The calculation device calculates an insertion loss value of the edge insertion loss bands in the second channel.

It is to be noted that, the data processing process of the steps 306 to 309 is the same as the data processing process of the steps 302 to 305 and will not be repeated here. Moreover, the two data processing processes may be executed simultaneously or successively, and the execution order is not limited.

It is to be noted that, in the LTE communication system, the system bandwidth may be divided into resource blocks, and the insertion loss of a small part of resource blocks in edge transition bands of the combined system will be higher than the insertion loss of the passband. However, in the LTE system, the high edge insertion loss only influences the performance of the resource blocks where the high edge insertion loss occurs, with little impact on the overall performance of the system. Moreover, the LTE system performs signal evaluation and scheduling by using a small bandwidth as a unit, and the direction of change in time-frequency characteristics of the transition bands of filters in the combiner is consistent, so that the change in channel characteristics is relatively gentle. In this case, assisted by the matched self-adaptive scheduling, the fluctuation in performance of the entire combined system caused by the large insertion loss of the edge insertion loss bands may be compensated, and its impact is thus minimized. In conclusion, the edge insertion loss bands of the combined channel may be used as transmission bands for signals, and the calculation process of the insertion loss of the edge insertion loss bands is realized by the steps 303 to 305.

310: The calculation device determines the insertion loss value of the typical insertion loss band of the first channel and the insertion loss value of the edge insertion loss bands of the first channel as an insertion loss value of the first channel of the combiner, and determines the insertion loss value of the typical insertion loss band of the second channel and the insertion loss value of the edge insertion loss bands of the second channel as an insertion loss value of the second channel of the combiner.

Wherein, the calculation device directly determines the calculated insertion loss value of the typical insertion loss band of the first channel, insertion loss value of the edge insertion loss bands of the first channel, insertion loss value of the typical insertion loss band of the second channel and insertion loss value of the edge insertion loss bands of the second channel as an insertion loss value of each channel of the combiner, respectively. After the insertion loss and the isolation of the combiner are determined, the isolation bandwidth of the combiner may be calculated.

Thus, when determining the insertion loss of each channel in the combiner, the insertion loss of the edge insertion loss bands and the insertion loss of the typical insertion loss band are calculated respectively, so that the overall performance loss of the combined system caused by the calculated insertion loss may be within a tolerable range. Meanwhile, the edge insertion loss value of the corresponding combined channel is far greater than the insertion loss value obtained in the prior art. Therefore, given the same isolation of the combiner, the isolation bandwidth of the combiner is decreased, and the frequency resources occupied by the isolation bandwidth and the waste of the frequency resources are thus reduced.

202: The calculation device determines an isolation between ports of the adjacent-channel combiner.

Wherein, the way of determining the isolation between ports of the adjacent-channel combiner may be as follows: determining, according to an isolation required to avoid inter-system interference during the combination of the first combined system and the second combined system, the isolation between ports.

For example, the first combined system is a Unicom 1.8 GHz LTE FDD system, and the second system is a Telecom 1.8 GHz LTE FDD system. The first combined system and the second combined system are in a same frequency band. By taking the interference of the second combined system by the first combined system as example, there are two kinds of interference between the first combined system and the second combined system. The first kind of interference is that signals transmitted by the first combined system interfere with the transmitting passband of the second combined system via the channel in the combiner. The second kind of interference is that signals transmitted by the first combined system interfere with the receiving passband of the second combined system via the channel in the combiner. The first kind of interference includes adjacent-carrier coexistence interference and standing-wave interference. For the adjacent-carrier coexistence interference, when an operator performs wideband configuration on the combined systems, since the standards in the 3GPP protocol have ensured that adjacent carriers in the first combined system and the second combined system may coexist without interference, it is not required to consider the adjacent-carrier coexistence interference when determining the isolation. For the standing-wave interference, the isolation of the combiner is feasible as long as the attenuation of standing waves generated by the first combined system exceeds a return loss corresponding to a standing wave threshold of the second combined system. In conclusion, the isolation of the combiner is calculated as 20 dB.

It is to be noted that, when the first combined system and the second combined system are systems which are not in a same frequency band, the value of the isolation between ports may be directly calculated according to related regulations of the protocol. When the first combined system and the second combined system are systems which are in a same frequency band, the above two kinds of interference need to be considered.

It is to be noted that the steps 201 and 202 may be executed simultaneously or successively, and the execution order is not limited.

203: The calculation device calculates the total isolation bandwidth according to the insertion loss of the adjacent-channel combiner and the isolation between ports of the adjacent-channel combiner.

Wherein, the total isolation bandwidth is an isolation bandwidth required during the combination of the first combined system and the second combined system. Calculating, by the calculation device, the total isolation bandwidth of the combiner according to the insertion loss and the isolation between ports may be realized by a method for simulating and calculating the isolation bandwidth according to the insertion loss and the isolation between ports in the prior art. Since various companies have independently developed or purchased simulation software, no limitation is given to the simulation method herein.

204: The calculation device determines guard bandwidths of the first combined system and guard bandwidths of the second combined system, respectively.

Figure 5:
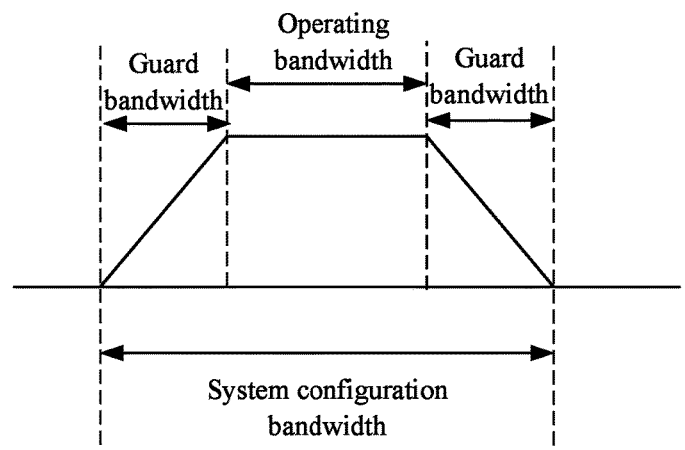
FIG. 5 is a schematic view showing the position of guard bands according to yet another embodiment of the present disclosure.

Wherein, as shown in FIG. 5, the guard bands are respectively bandwidth of a certain width reserved at two ends of the configured bandwidth of each system in order to avoid the interference from out-of-band systems. The guard bandwidth of each system is not necessarily identical.

It is to be noted that, the steps 201, 202 and 203 show a process of calculating the total isolation bandwidth, the process and the step 204 may be executed simultaneously or successively, and the execution order is not limited.

205: The calculation device calculates an actual isolation bandwidth of the adjacent-channel combiner according to the guard bandwidths of the first combined system, the guard bandwidths of the second combined system and the total isolation bandwidth.

Figure 6:
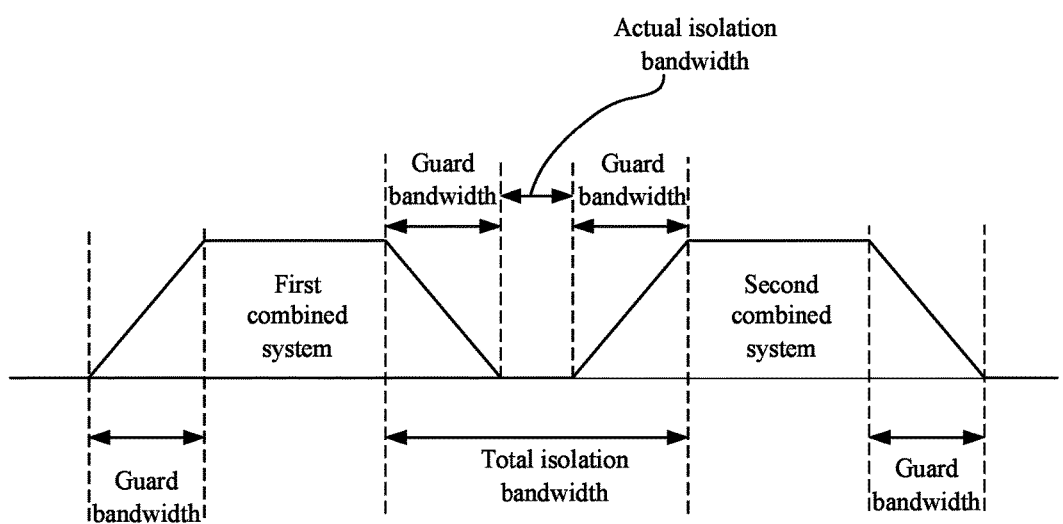
FIG. 6 is a schematic view showing the position of an isolation bandwidth according to still another embodiment of the present disclosure.

Wherein, the way of calculating the isolation bandwidth of the adjacent-channel combiner may be as follows: calculating the isolation bandwidth of the combiner according to the following formula: the total isolation bandwidth=the guard bandwidth adjacent to the isolation band in the first combined system+the isolation bandwidth+the guard bandwidth adjacent to the isolation band in the second combined system. FIG. 6 shows the positional relationship between the bandwidth of the first combined system, the bandwidth of the second combined system and the isolation bandwidth.

It is to be noted that, this embodiment of the present disclosure may be applicable to various scenarios, for example, adjacent-channel combination of an LTE FDD system and an LTE TDD system, adjacent-channel combination of an LTE TDD system and another LTE TDD system, and combination of equal-wideband adjacent-channel systems such as an LTE FDD system and another LTE FDD system.

It is to be noted that, in this embodiment of the present disclosure, the guard bandwidths in the combined systems are used as a part of the total isolation bandwidth of the combiner. Therefore, the operating bandwidth of each combined system to be occupied by the isolation bandwidth is reduced, and the waste of frequency resources is avoided particularly during the combination of adjacent-channel combined systems. Meanwhile, for a 4G (4th Generation) wideband communication system for realizing high-speed data communication by using wider bandwidths, the method in this embodiment of the present disclosure may reduce the influence of the isolation band on the high-speed data transmission.

In the embodiment of the present disclosure, first, an insertion loss and an isolation between ports of a combiner are determined, and guard bandwidths of combined systems are determined; and, a total isolation bandwidth of the combiner is calculated according to the insertion loss and the isolation between ports, and an actual isolation bandwidth of the combiner is calculated according to the guard bandwidths of the combined systems and the total isolation bandwidth. Thus, the calculation device may use bandwidths not for transmission in the combined systems as a part of the total isolation bandwidth required during the combination by the combiner, so that the frequency band isolation between the combined systems is reduced, and the bandwidth of each combined system to be occupied by the isolation bandwidth is reduced. Accordingly, the bandwidth for transmission in each system is increased relatively, the waste of frequency resources is avoided, and the utilization of frequency resources is increased.

Figure 7:
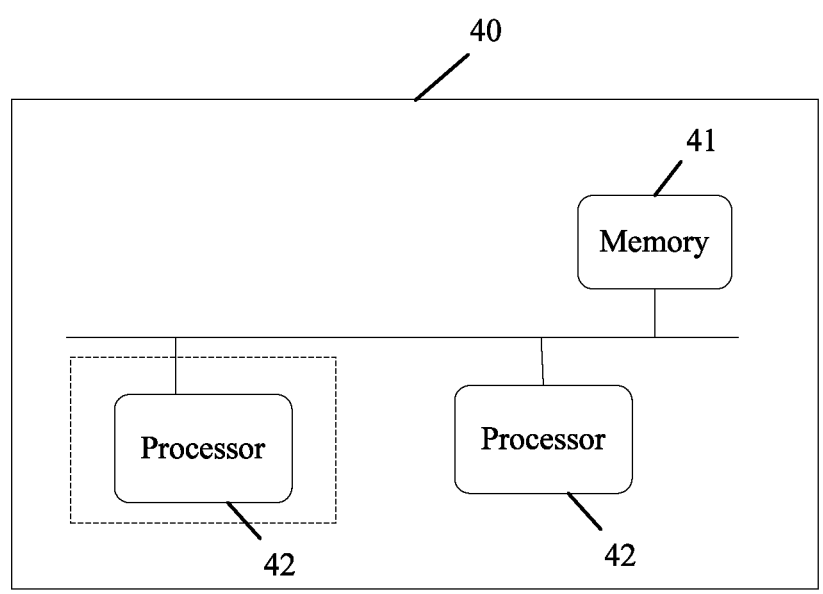
FIG. 7 is a schematic structure diagram of a device according to further another embodiment of the present disclosure.

Another embodiment of the present disclosure provides a device 40 for combining with a minimum isolation bandwidth. As shown in FIG. 7, the device 40 includes a memory 41 and one or more processors 42. The memory 41 is configured to store programs. The one or more processors 42 are configured to read programs in the memory 41 and perform the following operations: determining an insertion loss and an isolation between ports of a combiner; calculating a total isolation bandwidth of an isolation band in the combiner according to the insertion loss and the isolation between ports; determining guard bandwidths adjacent to the isolation band in combined systems, the combined systems being at least two communication systems combined by the combiner; and calculating an actual isolation bandwidth of the combiner according to the guard bandwidths of the combined systems and the total isolation bandwidth.

Further, the one or more processors 42 are specifically configured to calculate an actual isolation bandwidth of the combiner according to the following formula: the total isolation bandwidth=the guard bandwidths adjacent to the isolation band in the combined systems+the actual isolation bandwidth.

Further, the combined systems are adjacent-channel systems; and, the one or more processors 42 are specifically configured to determine, according to an isolation required to avoid inter-system interference during the combination of the combined systems, the isolation between ports.

Further, the one or more processors 42 are specifically configured to determine guard bandwidths of the combined systems according to the configuration information of the combined systems.

Further, the one or more processors 42 are specifically configured to: determine, according to an estimation of an uplink sensitivity of the combined systems, an uplink insertion loss corresponding to a permissible desensitization value of the uplink sensitivity; determine, according to an link budget of a downlink power link in the combined systems, a downlink insertion loss corresponding to a permissible attenuation value of the downlink power link; and, determine a minimum value of the uplink insertion loss and the downlink insertion loss as the insertion loss.

Further, the one or more processors 42 may further be configured to: divide, according to a preset proportion, a frequency band of each combined channel into edge insertion loss bands and a typical insertion loss band, the typical insertion loss band being a frequency band with a performance reaching a preset standard in the combined system, the edge insertion loss bands being frequency bands with a performance not reaching the preset standard in the combined system, the combined systems being communication systems combined by the combiner, the combined channels being in one-to-one correspondence to the combined systems, the combiner at least comprising two combined systems; calculate an insertion loss value of the typical insertion loss bands, and calculate an insertion loss value of the edge insertion loss bands according to the insertion loss value of the typical insertion loss band; and determine the insertion loss value of the typical insertion loss band and the insertion loss value of the edge insertion loss bands as the insertion loss value of the combiner.

Further, the one or more processors 42 are further configured to: determine a relaxation factor for a performance loss of the combined system, the relaxation factor being a proportion in which the insertion loss of the combiner is permitted to relax when the combiner is a non-isolation bandwidth adjacent-channel combiner; determine an impact factor for the performance of the combined system, the impact factor being a proportion in which the performance loss of the combined systems is impacted by the insertion loss of the combiner; and, determine a ratio y of the bandwidth of the typical insertion loss band to the bandwidths of the edge insertion loss bands; and calculate an insertion loss value of the edge insertion loss bands according to the following formula: the insertion loss value of the typical insertion loss band×the relaxation factor×y=the impact factor×the insertion loss value of the edge insertion loss bands.

Wherein, the edge insertion loss bands include a left edge insertion loss band and a right edge insertion loss band, the left edge insertion loss band and the right edge insertion loss band being located at two ends of the typical insertion loss band, respectively; and the insertion loss value of the edge insertion loss bands includes an insertion loss value of the left edge insertion band and an insertion loss value of the right edge insertion band.

Further, the one or more processors 42 are further configured to determine an insertion loss weight x1 that the insertion loss value of the left edge insertion band accounts for the insertion loss value of the edge insertion loss bands, and an insertion loss weight x2 that the insertion loss value of the right edge insertion band accounts for the insertion loss value of the edge insertion loss bands; determine the insertion loss value of the left edge insertion loss band according to the following formula: the insertion loss value of the typical insertion loss band×the relaxation factor×y=(x1/(x1+x2))×the impact factor×the insertion loss value of the left edge insertion loss band; and, determine the insertion loss value of the right edge insertion loss band according to the following formula: the insertion loss value of the typical insertion loss band×the relaxation factor×y=(x2/(x1+x2))×the impact factor×the insertion loss value of the right edge insertion loss band; and determine the insertion loss value of the left edge insertion loss band and the insertion loss value of the right edge insertion loss band as the insertion loss value of the edge insertion loss bands.

Wherein, the combined systems of the combiner are adjacent-channel combined systems.

In the embodiment of the present disclosure, an insertion loss and an isolation between ports of a combiner are determined, and guard bandwidths of combined systems are determined; and, a total isolation bandwidth of the combiner is calculated according to the insertion loss and the isolation between ports, and an actual isolation bandwidth of the combiner is calculated according to the guard bandwidths of the combined systems and the total isolation bandwidth. Thus, the calculation device 40 can use bandwidths not for transmission in the combined systems as a part of the total isolation bandwidth required during the combination by the combiner, so that the actual isolation bandwidth of the combiner becomes smaller. Accordingly, the bandwidth of each combined system to be occupied by the isolation bandwidth is reduced, the bandwidth for transmission in each system is increased relatively, the waste of frequency resources is avoided, and the utilization of frequency resources is increased.

The device for combining with a minimum isolation bandwidth according to this embodiment of the present disclosure can implement the method embodiments described above, and the specific function implementations refer to the description of the method embodiments and will not be repeated here. The method and device for combining with a minimum isolation bandwidth according to the embodiments of the present disclosure may be applicable to but not limited to a calculation device.

A person of ordinary skill in the art should understand that, all or part of the flows in the method embodiments may be implemented by instructing related hardware using computer programs, and the programs may be stored in a computer readable storage medium which, when executed, may include the flows of the embodiments of the methods. Wherein, the storage medium may be a magnetic disc, an optical disc, an ROM (Read-Only Memory), an RAM (Random Access Memory) or the like.

The foregoing descriptions merely show specific implementations of the present disclosure, but the protection scope of the present disclosure is not limited thereto. Any person of skill in the art may easily conceive of variations or replacements within the technical scope disclosed by the present disclosure, and these variations or replacements shall fall into the protection scope of the present disclosure. Accordingly, the protection scope of the present disclosure shall be subject to the protection scope defined by the claims.

What is claimed is:

1. A method for setting an isolation bandwidth of a combiner, the combiner being used for combining combined systems, the combined systems being at least two communication systems, the method, comprising:
   determining an insertion loss of the combiner and an isolation between ports of the combiner;
   calculating a total isolation bandwidth of an isolation band in the combiner according to the insertion loss and the isolation between ports;
   determining guard bandwidths adjacent to the isolation band in the combined systems;
   calculating an actual isolation bandwidth of the combiner according to the guard bandwidths of the combined systems and the total isolation bandwidth, the guard bandwidths being a part of the total isolation bandwidth; and
   setting the actual isolation bandwidth as the isolation bandwidth of the combiner.

2. The method according to claim 1, wherein the step of calculating an isolation bandwidth of the combiner according to the guard bandwidths of the combined systems and the total isolation bandwidth comprises:
   calculating an actual isolation bandwidth of the combiner by subtracting the guard bandwidths adjacent to the isolation band in the combined systems from the total isolation bandwidth.

3. The method according to claim 1, wherein determining an isolation between ports of the combiner comprises:
   determining, according to an isolation required to avoid inter-system interference during the combination of the combined systems, the isolation between ports.

4. The method according to claim 1, wherein determining an insertion loss of the combiner comprises:
   determining, according to an estimation of an uplink sensitivity of the combined systems, an uplink insertion loss corresponding to a permissible desensitization value of the uplink sensitivity;
   determining, according to an link budget of a downlink power link of the combined systems, a downlink insertion loss corresponding to a permissible attenuation value of the downlink power link; and
   determining a minimum value of the uplink insertion loss and the downlink insertion loss as the insertion loss.

5. The method according to claim 1, wherein
   a frequency band of a combined channel is divided into edge insertion loss bands and a typical insertion loss band according to a present proportion, the typical insertion loss band being a frequency band with a performance reaching a preset standard in a corresponding combined system, the edge insertion loss bands being frequency bands with a performance not reaching the preset standard in the combined system, combined channels being in one-to-one correspondence to the combined systems;
   determining an insertion loss of the combiner comprises:
   calculating an insertion loss value of the typical insertion loss band, and calculating an insertion loss value of the edge insertion loss bands according to the insertion loss value of the typical insertion loss band; and
   determining the insertion loss value of the typical insertion loss band and the insertion loss value of the edge insertion loss bands as an insertion loss value of the combiner.

6. The method according to claim 5, wherein before the step of calculating an insertion loss value of the edge insertion loss bands according to the insertion loss value of the typical insertion loss band, the method further comprises:
   determining a relaxation factor for a performance loss of the combined systems, the relaxation factor being a proportion in which the insertion loss of the combiner is permitted to relax when the combiner is a non-isolation bandwidth adjacent-channel combiner;
   determining an impact factor for the performance of the combined systems, the impact factor being a proportion in which the performance loss of the combined systems is impacted by the insertion loss of the combiner; and
   determining a ratio y of a bandwidth of the typical insertion loss band to bandwidths of the edge insertion loss bands; and
   the step of calculating an insertion loss value of the edge insertion loss bands according to the insertion loss value of the typical insertion loss band comprises:
   calculating an insertion loss value of the edge insertion loss bands according to the following formula: the insertion loss value of the typical insertion loss band× the relaxation factor×y=the impact factor×the insertion loss value of the edge insertion loss bands.

7. The method according to claim 6, wherein the edge insertion loss bands comprise a left edge insertion loss band and a right edge insertion loss band, the left edge insertion loss band and the right edge insertion loss band being located at two ends of the typical insertion loss band; and the insertion loss value of the edge insertion loss bands comprises an insertion loss value of the left edge insertion band and an insertion loss value of the right edge insertion band.

8. The method according to claim 7, wherein before the step of calculating an insertion loss value of the edge insertion loss bands according to the insertion loss value of the typical insertion loss band, the method further comprises:
   determining an insertion loss weight x1 that the insertion loss value of the left edge insertion band accounts for the insertion loss value of the edge insertion loss bands, and an insertion loss weight x2 that the insertion loss value of the right edge insertion band accounts for the insertion loss value of the edge insertion loss bands; and the step of calculating an insertion loss value of the edge insertion loss bands according to the insertion loss value of the typical insertion loss band comprises:
determining the insertion loss value of the left edge insertion loss band according to the following formula: the insertion loss value of the typical insertion loss band×the relaxation factor×y=(x1/(x1+x2))×the impact factor×the insertion loss value of the left edge insertion loss band;
determining the insertion loss value of the right edge insertion loss band according to the following formula: the insertion loss value of the typical insertion loss band×the relaxation factor×y=(x2/(x1+x2))×the impact factor×the insertion loss value of the right edge insertion loss band; and
determining the insertion loss value of the left edge insertion loss band and the insertion loss value of the right edge insertion loss band as the insertion loss value of the edge insertion loss bands.

9. The method according to claim 5, wherein the combined systems of the combiner are adjacent-channel combined systems.

10. The method according to claim 1, wherein the step of determining guard bandwidths of the combined systems comprises:
determining guard bandwidths of the combined systems according to the configuration information of the combined systems.

11. A device for setting an isolation bandwidth of a combiner, the combiner being used for combining combined systems, the combined systems being at least two communication systems, the device comprising:
a memory configured to store programs;
one or more processors configured to read programs in the memory and perform the following operations:
determining an insertion loss of the combiner and an isolation between ports of the combiner;
calculating a total isolation bandwidth of an isolation band in the combiner according to the insertion loss and the isolation between ports;
determining guard bandwidths adjacent to the isolation band in the combined systems; and
calculating an actual isolation bandwidth of the combiner according to the guard bandwidths of the combined systems and the total isolation bandwidth, the guard bandwidths being a part of the total isolation bandwidth; and
a transceiver configured to sending the actual isolation bandwidth of the combiner to a setter, so that the setter is able to set the actual isolation bandwidth as the isolation bandwidth of the combiner.

12. The device according to claim 11, wherein the one or more processors are configured to calculate an actual isolation bandwidth of the combiner by subtracting the guard bandwidths adjacent to the isolation band in the combined system from the total isolation bandwidth.

13. The device according to claim 11, wherein the combined systems are adjacent-channel systems; and, the one or more processors are configured to determine, according to an isolation required to avoid inter-system interference during the combination of the combined systems, the isolation between ports.

14. The device according to claim 11, wherein the one or more processors are configured to: determine, according to an estimation of an uplink sensitivity of the combined systems, an uplink insertion loss corresponding to a permissible desensitization value of the uplink sensitivity; determine, according to an link budget of a downlink power link in the combined systems, a downlink insertion loss corresponding to a permissible attenuation value of the downlink power link; and, determine a minimum value of the uplink insertion loss and the downlink insertion loss as the insertion loss.

15. The device according to claim 11, wherein
a frequency band of a combined channel is divided into edge insertion loss bands and a typical insertion loss band according to a preset proportion, the typical insertion loss band being a frequency band with a performance reaching a preset standard in a corresponding combined system, the edge insertion loss bands being frequency bands with a performance not reaching the preset standard in the combined system, the combined channels being in one-to-one correspondence to the combined systems;
the one or more processors are configured to:
calculate an insertion loss value of the typical insertion loss band, and calculate an insertion loss value of the edge insertion loss bands according to the insertion loss value of the typical insertion loss band; and
determine the insertion loss value of the typical insertion loss band and the insertion loss value of the edge insertion loss bands as the insertion loss value of the combiner.

16. The device according to claim 15, wherein the one or more processors are further configured to:
determine a relaxation factor for a performance loss of the combined systems, the relaxation factor being a proportion in which the insertion loss of the combiner is permitted to relax when the combiner is a non-isolation bandwidth adjacent-channel combiner;
determine an impact factor for the performance of the combined systems, the impact factor being a proportion in which the performance loss of the combined systems is impacted by the insertion loss of the combiner; and, determine a ratio y of a bandwidth of the typical insertion loss band to bandwidths of the edge insertion loss bands; and
calculate an insertion loss value of the edge insertion loss bands according to the following formula: the insertion loss value of the typical insertion loss band×the relaxation factor×y=the impact factor×the insertion loss value of the edge insertion loss bands.

17. The device according to claim 16, wherein the edge insertion loss bands comprise a left edge insertion loss band and a right edge insertion loss band, the left edge insertion loss band and the right edge insertion loss band being located at two ends of the typical insertion loss band; and the insertion loss value of the edge insertion loss bands comprises an insertion loss value of the left edge insertion band and an insertion loss value of the right edge insertion band.

18. The device according to claim 17, wherein the one or more processors are further configured to:
determine an insertion loss weight x1 that the insertion loss value of the left edge insertion band accounts for the insertion loss value of the edge insertion loss bands, and an insertion loss weight x2 that the insertion loss value of the right edge insertion band accounts for the insertion loss value of the edge insertion loss bands;
determine the insertion loss value of the left edge insertion loss band according to the following formula: the insertion loss value of the typical insertion loss band× the relaxation factor×y=(x1/(x1+x2))×the impact factor×the insertion loss value of the left edge insertion loss band; and, determine the insertion loss value of the right edge insertion loss band according to the following formula: the insertion loss value of the typical insertion loss band×the relaxation factor×y=(x2/(x1+x2))×the impact factor×the insertion loss value of the right edge insertion loss band; and determine the insertion loss value of the left edge insertion loss band and the insertion loss value of the right edge insertion loss band as the insertion loss value of the edge insertion loss bands.

19. The device according to claim 15, wherein the combined systems of the combiner are adjacent-channel combined systems.

20. The device according to claim 11, wherein the one or more processors are configured to determine guard bandwidths of the combined systems according to the configuration information of the combined systems.

* * * * *